United States Patent
Moriwaki

(10) Patent No.: US 6,643,398 B2
(45) Date of Patent: Nov. 4, 2003

(54) IMAGE CORRECTION DEVICE, IMAGE CORRECTION METHOD AND COMPUTER PROGRAM PRODUCT IN MEMORY FOR IMAGE CORRECTION

(75) Inventor: Kagumi Moriwaki, Itami (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/368,043

(22) Filed: Aug. 3, 1999

(65) Prior Publication Data

US 2003/0152283 A1 Aug. 14, 2003

(30) Foreign Application Priority Data

Aug. 5, 1998 (JP) ............................ 10-232392
Aug. 5, 1998 (JP) ............................ 10-232393

(51) Int. Cl.$^7$ .............................................. G06K 9/00
(52) U.S. Cl. ................... 382/167; 382/168; 358/3.1; 358/1.9
(58) Field of Search ................... 382/167, 168, 382/266, 166; 358/458, 520, 504, 3.1, 1.9

(56) References Cited

U.S. PATENT DOCUMENTS

| | | | | |
|---|---|---|---|---|
| 5,204,948 A | * | 4/1993 | Kato | 358/520 |
| 5,224,177 A | * | 6/1993 | Doi et al. | 382/168 |
| 5,355,163 A | * | 10/1994 | Tomitaka | 348/234 |
| 5,838,455 A | * | 11/1998 | Imaizumi et al. | 358/298 |
| 6,128,407 A | * | 10/2000 | Inoue et al. | 382/167 |

OTHER PUBLICATIONS

Atsuhisa Saito, Koichi Ogawa and Masato Nakajima, "Development of Optimum Contrast Enhancement Using Fuzzy Sets", *The Institute of Electronics, Information and Communication Engineering Transactions*, vol. J73–D–II, No. 9, Sep. 1990, pp. 1504–1511 (English translation attached).

Naoki Kobayashi, Hideo Saito and Masato Nakajima, "Fast Adaptive Contrast Enhancement Method for the Display of Gray–Tone Images", *The Institute of Electronics, Information and Communication Engineering Transactions*, vol. J77–D–II, No. 3, Mar. 1994, pp. 502–509 (English translation attached).

* cited by examiner

*Primary Examiner*—Anh Hong Do
(74) *Attorney, Agent, or Firm*—Sidley Austin Brown & Wood LLP

(57) ABSTRACT

This invention relates to image correction device and image correction method for compensating both the contrast and the brightness of the original image, suppressing the contrast enhancement, improving the lightness, and transforming an image with extremely bright areas or extremely dark areas into an image with correct contrast and lightness. To correct the contrast, the original image is divided into a plurality of areas, a histogram fabricated to show the frequency distribution for the pixel lightness in each area and a lightness mapping curve made for the accumulated value. The pixel lightness for each area within the image is converted based on the lightness mapping curve. To correct the lightness of the original image, the average lightness is compensated when determined to be extremely bright or extremely dark.

26 Claims, 12 Drawing Sheets

Fig. 1

| SCENE | AVERAGE LIGHTNESS | MOST FREQUENT HUE VALUE | DISPERSION | CLIPPING LEVEL |
|---|---|---|---|---|
| NORMAL | REGULAR | | | ZERO(0), NO CONTRAST CORRECTION |
| | | RED-to-YELLOW | SMALL | LOWER THE CLIPPING LEVEL |
| BACK-LIGHTING HIGH CONTRAST | | | | ZERO(0), NO CONTRAST CORRECTION |
| | | RED-to-YELLOW | SMALL | LOWER THE CLIPPING LEVEL |
| OVER-LIGHT IN LOCALIZED SPOTS | EXCEPT EXCESSIVELY BRIGHT, BRIGHT | | SMALL | ZERO(0), NO CONTRAST CORRECTION |
| | | RED-to-YELLOW | | LOWER THE CLIPPING LEVEL |
| UNDER-LIGHT IN LOCALIZED SPOTS | EXCEPT EXCESSIVELY DARK, DARK | | SMALL | ZERO(0), NO CONTRAST CORRECTION |
| | | RED-to-YELLOW | | LOWER THE CLIPPING LEVEL |

Fig. 2

| SCENE | AVERAGE LIGHTNESS | TRANSFER AMOUNT |
|---|---|---|
| NORMAL | | ZERO (0) |
| BACK-LIGHTING HIGH CONTRAST | EXCESSIVELY DARK | LARGER |
| | DARK | SMALLER |
| | BRIGHT | SMALLER |
| | EXCESSIVELY BRIGHT | LARGER |
| | OTHERS | ZERO (0) |
| OVER-LIGHT IN LOCALIZED SPOTS | EXCESSIVELY BRIGHT | LARGER |
| | BRIGHT | SMALLER |
| | OTHERS | ZERO (0) |
| UNDER-LIGHT IN LOCALIZED SPOTS | EXCESSIVELY DARK | LARGER |
| | DARK | SMALLER |
| | OTHERS | ZERO (0) |

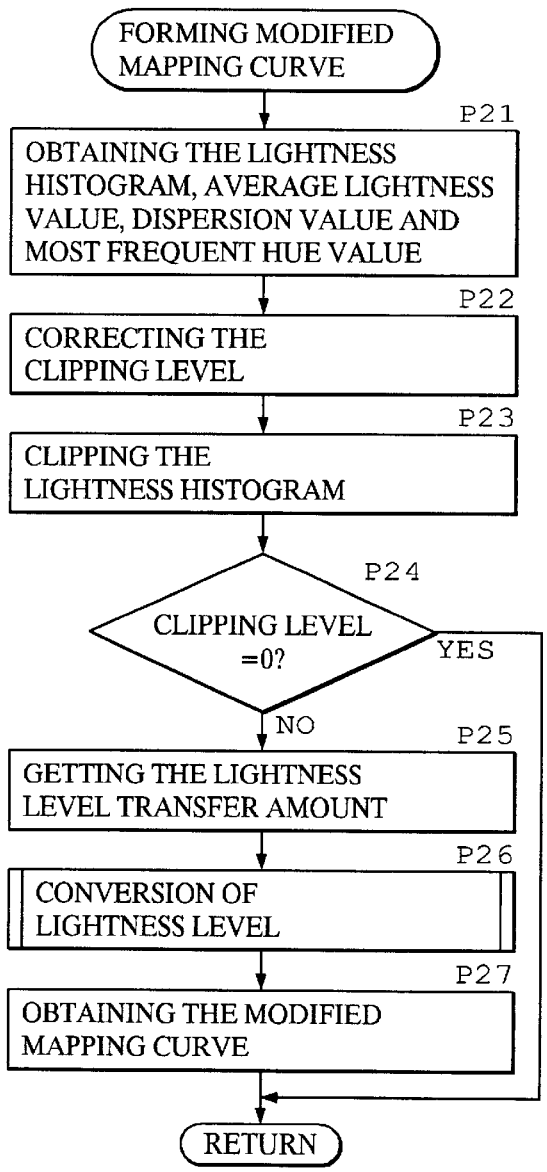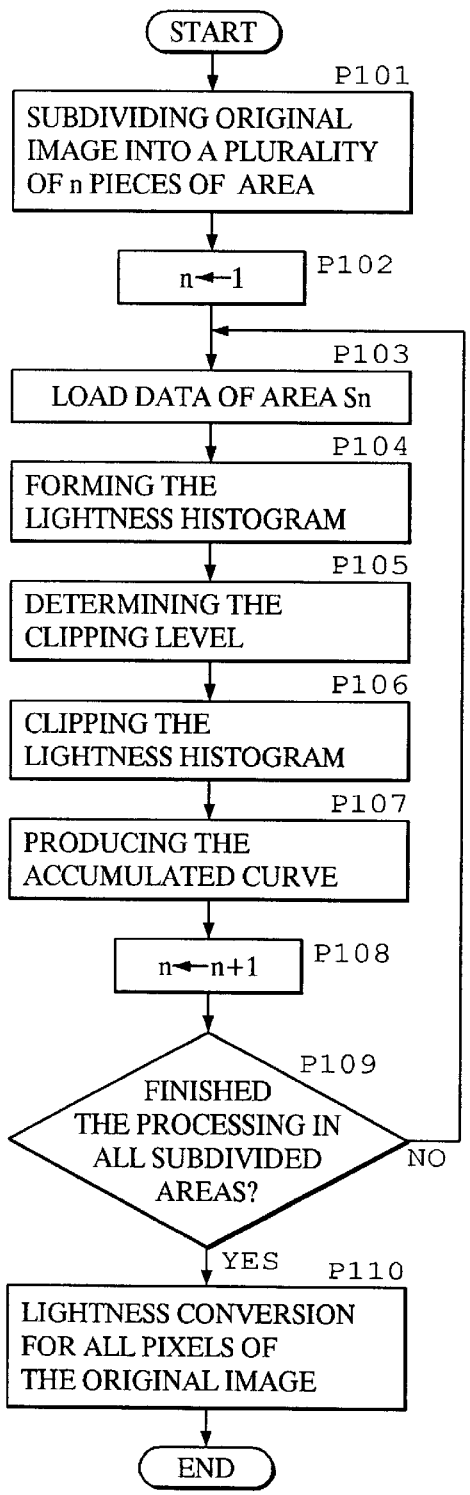

Fig. 13
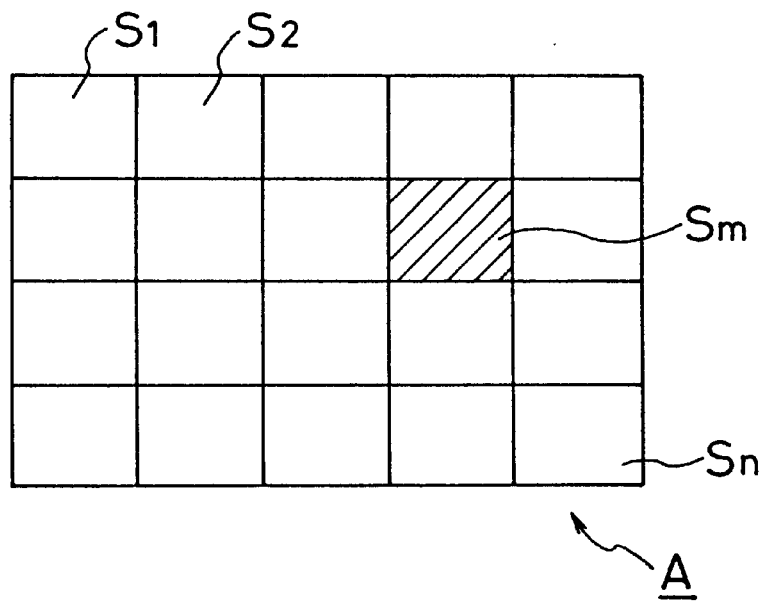
PRIOR ART  # Fig. 14
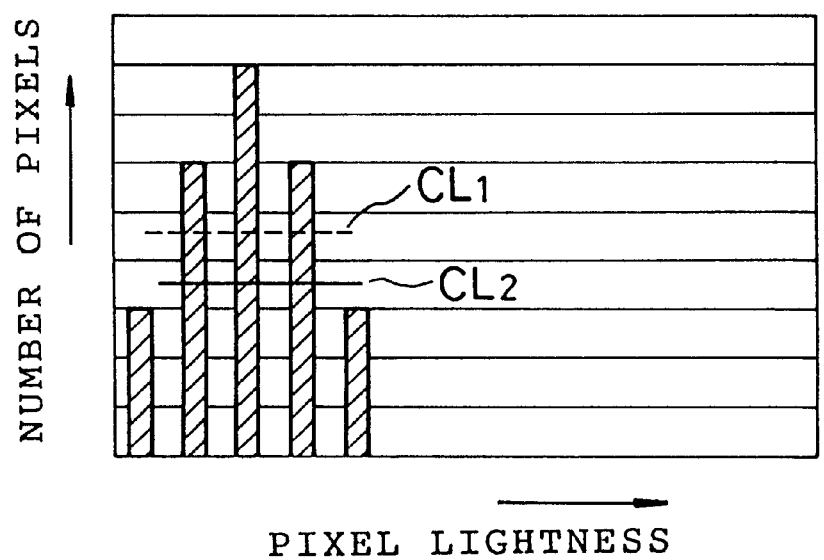

PRIOR ART Fig. 15
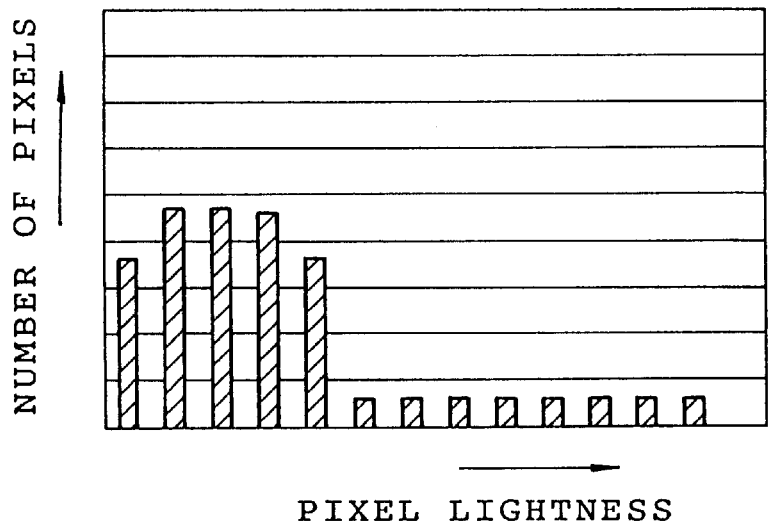
PRIOR ART Fig. 16
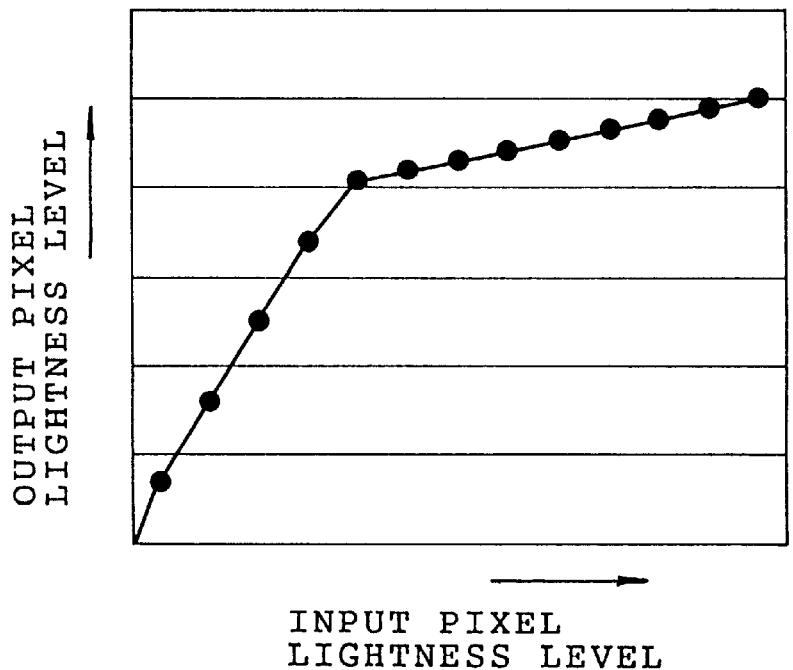

PRIOR ART Fig. 17
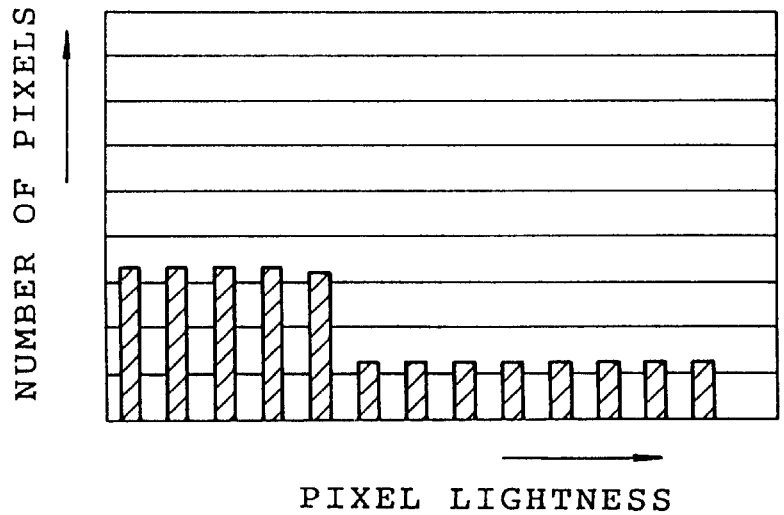
PRIOR ART Fig. 18
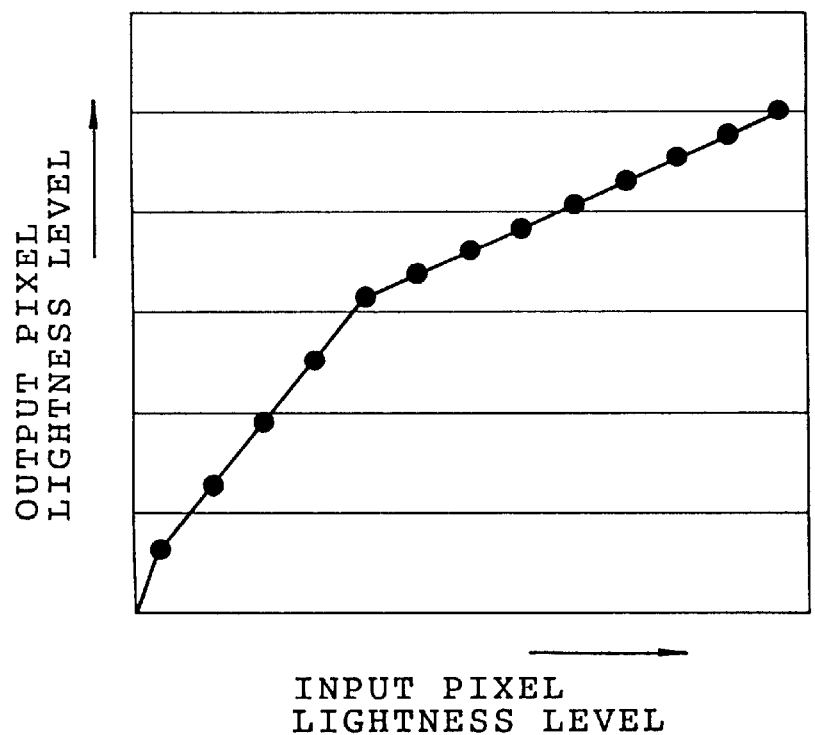

IMAGE CORRECTION DEVICE, IMAGE CORRECTION METHOD AND COMPUTER PROGRAM PRODUCT IN MEMORY FOR IMAGE CORRECTION

This application is based on applications Nos. 10-232392 and 10-232393 filed in Japan, the contents of which are hereby incorporated by reference.

BACKGROUND OF THE INVENTION

1. Field of the Invention

The present invention relates to an image correction device, image correction method, and a computer program product in memory for image correction, capable of automatically correcting the brightness and contrast of the image and forming an image having ideal contrast and brightness.

2. Description of Related Art

Enhancing the contrast of the image, namely by processing that expands the lightness range at which the image is obtained and adjusts the contrast of a portion of the image is a widely known technique for improving the image quality.

When for instance, the image contrast is low, the lightness range acquired by the image is narrow. However, if the contrast could be raised by expanding the lightness range acquired by the image, from a high lightness image to an image with lower lightness, then an balanced image could be achieved and a shape difficult to see on a low contrast image could then easily be seen.

A method called histogram equalization is the conventional method used to enhance image contrast. In this method, a histogram is produced showing the lightness distribution of all pixels forming the original image, the accumulation curve of the histogram is converted into a modified mapping curve in which the pixel lightness values of the original image are converted into new lightness values and the image contrast then enhanced.

Since this method converts the lightness of pixels for the entire (all areas) original image into a new lightness with an identical modified mapping curve, then the locally varying contrast is likely to drop in portions. Consequently, when enhanced contrast over an entire image is needed, then contrast enhancement must be performed that matches those areas where contrast enhancement is needed.

A method called adaptive histogram equalization has therefore been proposed. In this method, the original image is subdivided into a plurality of rectangular areas, a histogram is produced showing the distribution status of lightness values for all pixels within each rectangular area, the histogram values are accumulated into a modified mapping curve, the modified mapping curve for each rectangular area found, and the lightness values of pixels within the rectangular area then converted into new lightness values. However, this method has the drawback that rectangular areas having over-enhanced contrast are prone to occur and the continuity of the contrast between adjacent rectangular areas becomes difficult to maintain.

In order to eliminate these drawbacks, values higher than a specified pixel distribution value are clipped from the histogram showing the distribution of pixel lightness values, the accumulated curve of values from the histogram is used as a modified mapping curve and by converting the lightness values of pixels within the rectangular area into new lightness values, image correction that limits the contrast enhancement can be performed.

Hereafter, the method for converting the pixel lightness by using the accumulated curve of values from the histogram as a modified mapping curve is explained while referring to FIG. 13 through FIG. 16. This conversion process is implemented by a CPU comprised of a image processing control device.

A view illustrating the scanning of the original image and the state when an original image A is stored in the image memory subdivided into a plurality of rectangular areas S1–Sn is shown in FIG. 13. The lightness for the total number of pixels in the area Sm is calculated and a histogram made. The histogram of FIG. 14, the vertical axis indicates the number of pixels and the horizontal axis indicates the pixel lightness. In FIG. 14, a line CL1 and a line CL2 indicate the clipping levels.

FIG. 15 is a histogram showing the histogram of FIG. 14 after being clipped with the clipping level CL1, the pixels greater than this clipping level are all distributed equally along the horizontal axis spanning the entire lightness. Distribution of pixels over the entire lightness values is achieved as a result of distributing pixels with a lightness greater than the clipping level, equally over the entire lightness.

Summing or accumulating the number of pixels of this histogram in the order of their lightness yields the accumulated curve shown in FIG. 16. This curve is called the modified mapping curve.

In the modified mapping curve of FIG. 16, the horizontal axis indicates the input pixel lightness level and the vertical axis indicates the output pixel lightness level. The output pixel lightness corresponding to the pixel lightness of the original image (input pixel lightness) is found according to the modified mapping curve, the pixel lightness of the original image is converted to the new pixel lightness and this conversion is performed on all pixels in the rectangular area Sm.

In the above process, the clipping level is determined by the lightness width (difference between the maximum and minimum lightness values) found from the histogram. Therefore, when the lightness width is narrow or in other words when the contrast is low, a high clipping level is set and when the lightness width is wide or in other words when the contrast is high, a low clipping level is set.

FIG. 17 shows a histogram level set at a low clipping level of CL2 (CL2<CL1) so that the pixel distribution over the entire lightness value is the results just as previously of equally distributing pixels with a lightness greater than the clipping level, over the total pixel lightness value.

In FIG. 18, a rectangular area Sm is made for the histogram shown in FIG. 17 and the sum of these respective histogram values is expressed in an accumulation curve or in other words, a modified mapping curve. Compared with the modified mapping curve with the high clipping level shown in FIG. 16, the inclination is not as steep. By using this modified mapping curve to perform lightness conversion of the original image pixels, the contrast enhancement of the image can be weakened.

A flowchart illustrating the above described processing is shown in FIG. 19. The original image is first subdivided into n pieces of rectangular areas S1–Sn (step P101). Next, a count value 1 is set in the counter (step P102) and a first rectangular data is loaded (step P103), the lightness per pixel is calculated, a histogram is made, and the lightness width is found (step P104). The clipping level is determined from the lightness width (step P105) and the histogramclipped (step P106). The pixel lightness of the histogram is summed, the accumulation curve is produced (step P107) to determine the brightness mapping curve matching that rectangular area.

Incrementing the counter (step P108) and a determination made that all processing of the subdivided image area is complete (step P109). If determined that the processing is not complete, the process returns to step P103 and processing of the next subdivided area is performed. When processing is complete, the lightness conversion (output lightness) is done from the pixel lightness (input lightness) for each rectangular area based on the modified mapping curve of each rectangular area, and lightness conversion is then performed for all pixels of the original image (step P110).

When the lightness of all pixels in the original image has been converted into new lightness values in the above processing, then image correction suppressing excessive contrast enhancement can be performed.

However, when the histogram is clipped to an appropriate clipping value and lightness conversion performed using the accumulated curve of the histogram as the modified mapping curve to correct the image contrast, a problem has been confirmed to occur in that the contrast is over-enhanced in light areas and dark areas in the image and also in that the improvement in brightness is insufficient in images such as high contrast images, back light images, image lightness is low in certain spots, image lightness is high in certain spots, etc. When for instance, correcting the image of a person whose face in back lighting appears dark, the facial portion may not appear very bright but if the contrast is over-enhanced then the image will appear unnatural.

SUMMARY OF THE INVENTION

1. In view of the above problems with the conventional art, this invention has the object of providing an image correction device and image correction method for automatically correcting the contrast and lightness of the original image and an image forming device capable of forming images with optimal contrast and brightness.

2. Another object of this invention is to provide an image correction device and image correction method for an image forming device capable of forming images with optimal contrast and lightness based on information relating to the original image scene and the average lightness of the image when correcting the contrast and lightness of the original image.

3. Still another object of this invention is to provide an image correction device and image correction method for automatically correcting the contrast and lightness of an area even when a portion of the lightness of the original image in that area is lighter or darker than the reference lightness and an image forming device capable of forming images with optimal contrast and brightness.

4. Yet another object of this invention is to provide computer program product in memory for image correction capable of forming an image with optimal contrast and lightness as well as to automatically correct the contrast and lightness of the original image.

5. Yet additional objects of this invention will become clear to those skilled in the art after understanding the detailed description of the invention while referring to the accompanying drawings.

BRIEF DESCRIPTION OF THE DRAWINGS

FIG. 1 is a diagram illustrating the conditions for determining the clipping level of the lightness histogram.

FIG. 2 is a diagram illustrating the lightness level transfer amount.

FIG. 11 is a flowchart illustrating in detail the process for forming the modified mapping curve.

FIG. 13 is a diagram illustrating the state for subdividing the original image into a plurality of rectangular images.

FIG. 14 is a diagram showing a lightness histogram of the lightness frequency distribution of the pixels in the conventional contrast correction process.

FIG. 15 is a diagram showing a histogram clipped at a clipping level CL1 in the conventional contrast correction process.

FIG. 16 is a diagram showing a modified mapping curve for the accumulated values of the histogram in the conventional contrast correction process.

FIG. 17 is a diagram showing a histogram clipped at a low clipping level CL2 in the conventional contrast correction process.

FIG. 18 is a diagram showing a modified mapping curve for the accumulated values of the histogram clipped at a low clipping level CL2 in the conventional contrast correction process.

FIG. 19 is a flowchart showing the conventional contrast correction process.

DETAILED DESCRIPTION OF THE PREFERRED EMBODIMENTS

Figure 3:
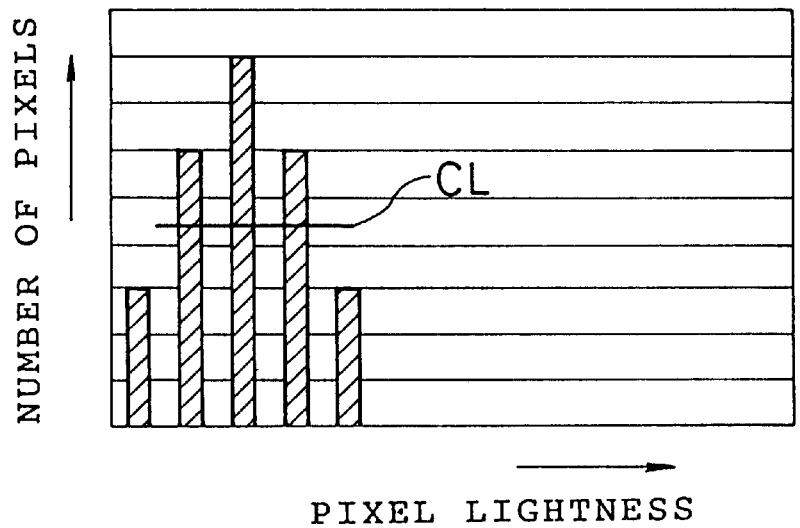
FIG. 3 is a diagram illustrating the lightness histogram showing the frequency distribution of pixel lightness in the subdivided image areas.

Hereafter, the embodiment of this invention is described while referring to the accompanying drawings.

Overall Process

A feature of the embodiment of this invention, the algorithm for correcting both the contrast and the lightness of the original image and improving the lightness while suppressing the contrast enhancement is explained next. This algorithm is incorporated into the image processing device for performing editing of the image and is therefore implemented by the CPU of the image processing device.

To correct the contrast of the original image, first the original image is subdivided into a plurality of areas, a lightness histogram is produced showing the lightness frequency distribution for the pixels of each subdivided area, and then clip the lightness histogram by a clipping level calculated based on the image scene, average lightness, dispersion and most frequent hue value.

The clipping level that was calculated is then corrected or converted according to the image status such as whether or not the image area is a skin color area or a flat area, that is, an area having almost uniform lightness and low contrast, the image scene is a normal scene, back lighting and high contrast, a portion of the image is over-light (over-light in localized spots) or a portion of the image is under-light) (under-light in localized spots).

The correction of the lightness of the original image will be done, in back lighting or high contrast scene, when determined that the average brightness is "excessively dark" "dark", "excessively bright" or "bright". The corrections can be made per scene to correct only the region requiring a change in the true lightness value. The determination such as "excessively dark" "dark", "excessively bright" or "bright" are made by making a comparison with preset threshold values for each state.

Just as related above, the clipping level of the lightness histogram is calculated based on the image scene, the average lightness, dispersion, and most frequent hue value. The clipped lightness histogram is corrected by the transfer amount determined based on the original image scene and average value. Then, accumulation curves of values summed from the now corrected and clipped histogram are made. The accumulated curve is used as a modified mapping curve (lightness conversion information for correcting the pixel lightness) to convert the pixel lightness of the original image to a new lightness, and correction of the image contrast then executed.

Correction of the Clipping Level

Hereafter, the correction of the lightness clipping level in this invention is described.

FIG. 1 is a diagram showing correction conditions for the clipping level.

First, the contrast correction process is adjusted according to whether the image area is a "skin color area" or "flat area" or is some other kind of area.

Whether or not the image area is a "skin color area" can be determined from the most frequent hue value (greatest amount of hue contained in that area) of that area. Processing to suppress the contrast of the hue portion and in particular the skin color is performed when determined that the area is a "skin color area". The image quality deteriorates and is unpleasant to view when the contrast is over-enhanced.

Whether or not the image area is a "flat area" can be determined from the dispersion value for the pixel lightness frequency distribution of that area. Changes in the contrast of the original image are not performed when determined to be a "flat area". When the contrast of a "flat area, is over-enhanced, changes in lightness tend to attach to much to an area causing blotches or streaks. Normal contrast enhancement is performed on areas other than "skin color areas" or "flat areas".

By utilizing the lightness information and scene information, the subsequently mentioned lightness corrections in the required region can be performed without clipping level corrections and the contrast need not be lowered.

When the image scene is "normal" and the dispersion is "small" then a flat area" is determined, set the clipping level as zero (0), contrast correction is not performed. Further, a "skin color area" is determined if the scene is "normal" in cases where the most frequent hue value is a "red-to-yellow", and correction is performed to lower the calculated clipping level.

A "flat area" is determined when the image scene is "back lighting or high contrast", the average lightness is "regular" and the dispersion is "small", and set the clipping level as zero (0), contrast correction is not performed. Further, if the scene is "back lighting or high contrast", the average lightness is "regular" and the dispersion is "small", a "skin color area" is determined in cases where the most frequent hue value is a "red-to-yellow", and correction is performed to lower the calculated clipping level.

A "flat area" is determined when the image scene is "over-light in localized spots", the average lightness is except "excessively bright or bright", and further the dispersion is "small", and set the clipping level as zero (0), contrast correction is not performed. Also, when the scene is "over-light in localized spots", the average lightness is except "excessively bright or bright" and the most frequent hue value is "red-to-yellow", a "skin color" area is determined and correction is performed to lower the calculated clipping level.

A "flat area " is determined when the image scene is "under-light in localized spots", the average lightness is except "excessively dark or dark", and further the dispersion is "small", and set the clipping level as zero (0), contrast correction is not performed. Also, when the scene is "under-light in localized spots", the average lightness is except "excessively dark or dark" and the most frequent hue value is "red-to-yellow", a "skin color" area is determined and correction is performed to lower the calculated clipping level.

An average lightness of "regular" indicates cases other than "excessively bright or bright" and "excessively dark or dark".

Correction to the calculated clipping level is not performed in cases other than the conditions established for the clipping level shown in FIG. 1.

Correction of Lightness

The correction of the lightness of the original image is described next. Image lightness correction is performed for each scene so that the lightness level of the original image is changed into a new lightness level. FIG. 2 is a diagram showing the lightness level transfer amounts.

Correction of the image lightness is not performed when the scene is determined to be a "normal" area so a transfer amount of zero (0) is set.

When the average lightness of a particular area is determined to be "excessively dark" or "dark" for a scene determined to be "back lighting or high contrast", then the transfer amount of the lightness level is set to a plus figure. The transfer amount is set to a somewhat larger figure to obtain a large change in the lightness in areas determined as "excessively dark". When an area is determined to be "dark", the transfer amount is set to a somewhat smaller figure so that the change in lightness will not be excessively large.

In the same way, when determined that the average lightness of a particular area is "excessively bright" or "bright", then the lightness level transfer amount is set to a plus figure. When determined that an area is "excessively bright", then a large change in lightness is obtained by setting a somewhat larger transfer amount. When an area is determined to be "bright", the transfer amount is set to a somewhat smaller figure so that the change in lightness will not be excessively large.

When determined that the lightness of a localized area is "excessively bright" in a scene of an area determined as "over-light in localized spots", the light level transfer amount is set to a somewhat larger figure to obtain a large change in the lightness. When an area is determined to be "bright", the transfer amount is set to a somewhat smaller figure so that the change in lightness will not be excessively large, the lightness of all other areas is not changed and the transfer amount is set to zero (0).

When determined that the lightness of a localized area is "excessively dark" in a scene of an area determined as "under-light in localized spots", the light level transfer amount is set to a somewhat larger figure to obtain a large change in the lightness. When an area is determined to be "dark", the transfer amount is set to a somewhat smaller figure so that the change in lightness will not be excessively large, the lightness of all other areas is not changed and the transfer amount is set to zero (0).

As explained above, the transfer amount of the lightness level is set to a somewhat large figure when determined that the lightness of an image area is "excessively bright" or is "excessively dark" in order to obtain the desired improvement in contrast by making a large change in the lightness of that image area. In this way the lightness of bright portions or dark portion of the modified mapping curve can be changed or in other words, a large change in the brightness can be made.

Next, adjusting the image brightness by transferring the lightness level is explained while referring to FIG. 3 through FIG. 7.

FIG. 3 is a diagram illustrating the lightness histogram made by calculating the lightness frequency distribution for pixels in the subdivided area after the original image has been subdivided into a plurality of rectangular areas. The horizontal axis is the pixel lightness and the vertical axis is the number of pixels. Also in FIG. 34 the line CL indicates the clipping level established in the previously explained method.

Figure 4:
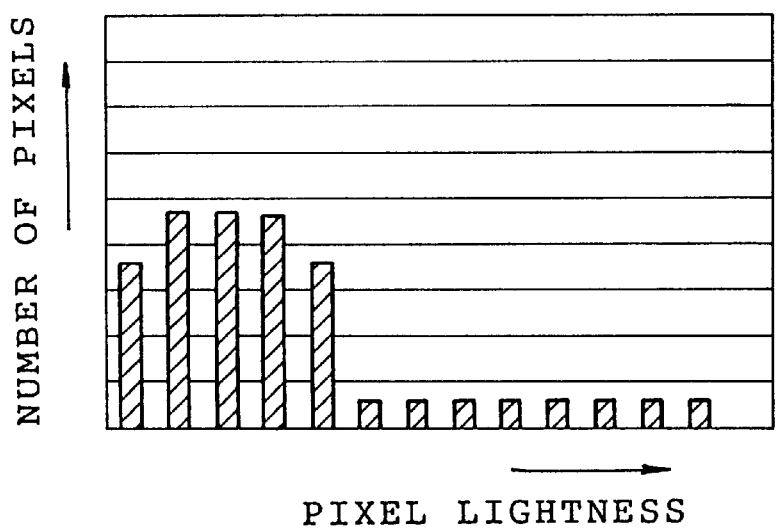
FIG. 4 is a diagram illustrating the lightness pictogram obtained by clipping the lightness histogram of FIG. 3 with a clipping level CL.
Figure 5:
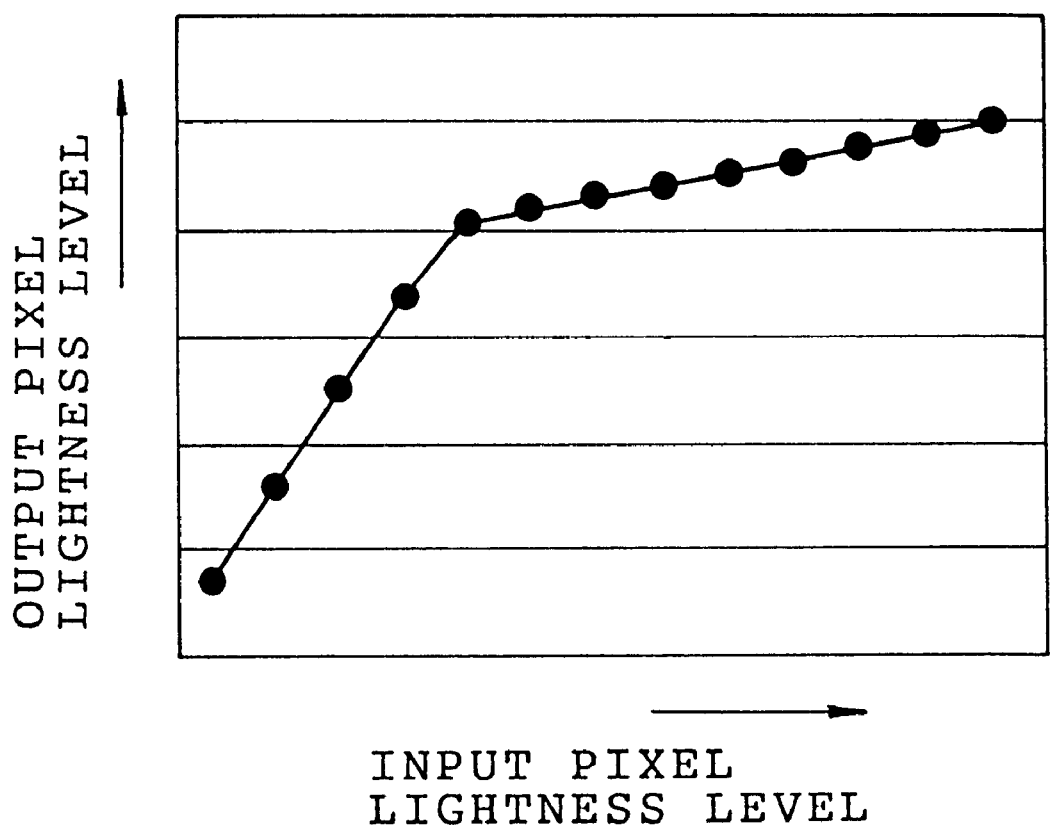
FIG. 5 is a diagram illustrating a modified mapping curve of the accumulated values of the lightness histogram of FIG. 4.

FIG. 4 is a diagram illustrating the lightness histogram obtained by clipping the lightness histogram of FIG. 3 with a clipping level CL. The horizontal axis indicates the pixel lightness and the vertical axis indicates the number of pixels. FIG. 5 is a modified mapping curve of the accumulated values of the lightness histogram of FIG. 4. The horizontal axis indicates the lightness level of the input pixels while the vertical axis indicates the lightness level of the output pixels. This mapping curve provides parameters for converting the pixels of the original image (input pixel lightness) into lightness output pixels.

Figure 6:
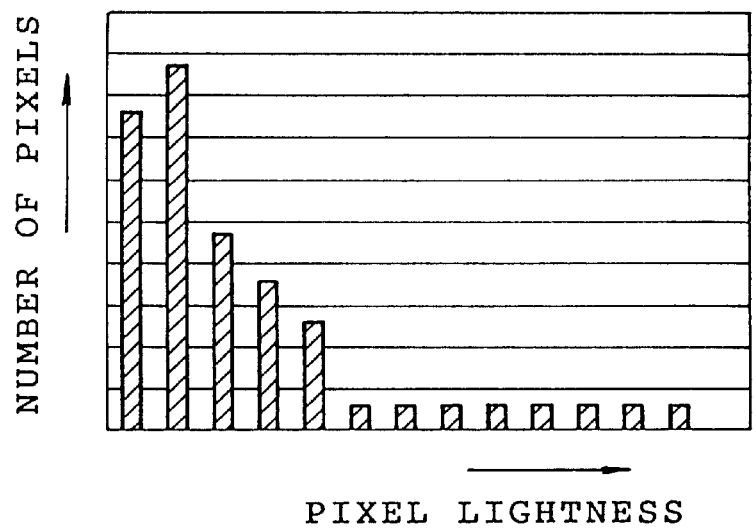
FIG. 6 is a diagram illustrating a lightness histogram showing the lightness frequency distribution of the lightness level of the original image transferred into a new lightness level based on the lightness histogram of FIG. 4.
Figure 7:
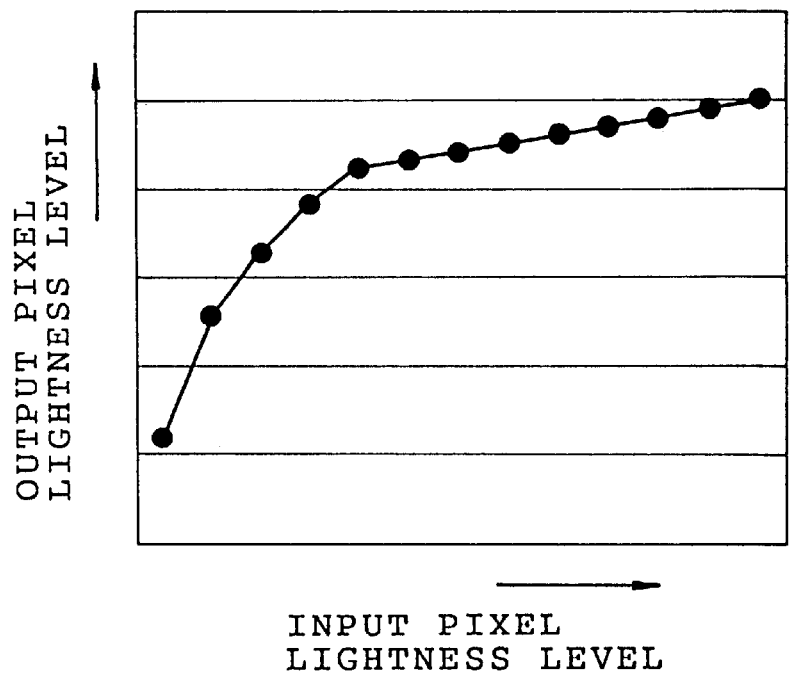
FIG. 7 is a diagram illustrating a modified mapping curve for the accumulated values of the lightness histogram of FIG. 6.

FIG. 6 is a diagram illustrating a lightness histogram made by calculating the lightness frequency distribution of the lightness level of the original image transferred into a new lightness level based on the lightness histogram of FIG. 4. The horizontal axis indicates the pixel lightness while the vertical axis indicates the number of pixels. FIG. 7 is a modified mapping curve of the accumulated values of the lightness histogram of FIG. 6. The horizontal axis indicates the pixel lightness level and the vertical axis indicates the output pixel lightness level. This mapping curve provides parameters for converting the lightness of the pixels of the original image (input pixel lightness) into the lightness of the output pixels.

When the modified mapping curve after transfer of the lightness level shown in FIG. 7 is compared with the modified mapping curve prior to lightness level transfer shown in FIG. 5, no change appears in the contrast of the overall image area for the modified mapping curve after lightness level transfer, however the lightness level of the output pixels or in other words the image brightness has moved upwards overall and the modified mapping curve has a protrusion or peak on the upper side of the curve, and the vicinity of the peak has become particularly bright. Also, increasing the transfer amount forms a curve peak even farther upwards and the fact that the change in brightness has become even larger can be observed.

Structure of Image Processing Device and Image Processing

Figure 8:
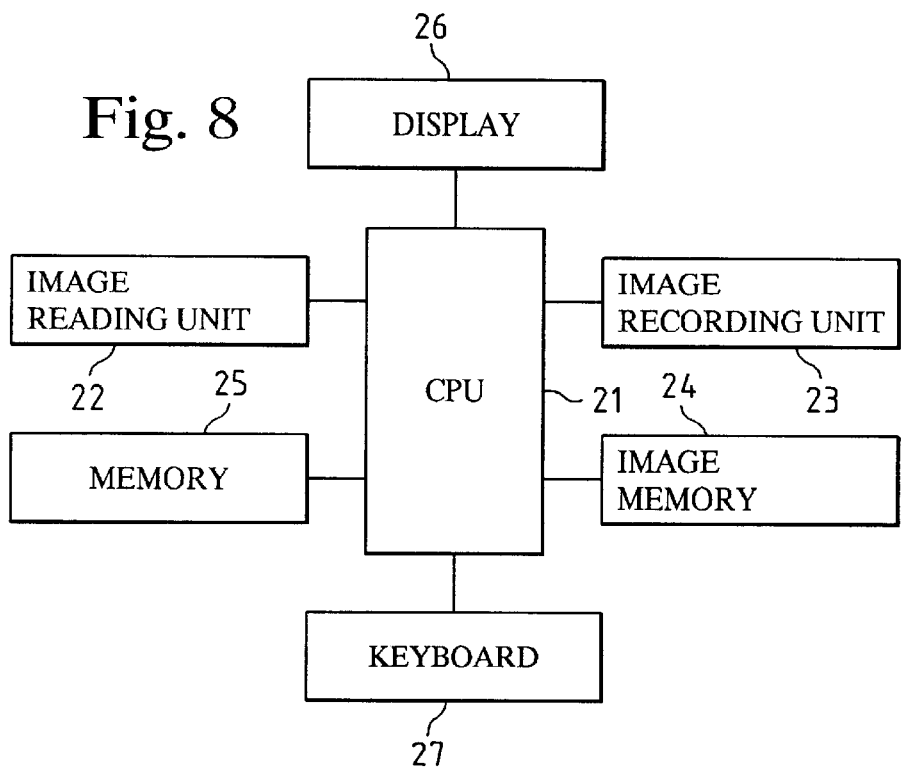
FIG. 8 is a block diagram showing the circuit structure of the image processing device.

FIG. 8 is a block diagram showing the circuit structure of the image processing device. An image processor 10 contains an image reading unit 22 such as an image reader for converting an original image into an image data signal connected to the input/output ports of a CPU21, CPU22 for implementing the image correction processing, an image recording unit 23 for driving the record medium for recording the corrected image data and the pre-correction image data signal, an image memory 24 for storing the corrected image data, the pre-correction image data and the image data signal from the image reading unit 22, a memory 25 for temporarily storing a histogram generated by the image correction processing, a modified mapping curve and other data, and further containing a display 26, and a keyboard 27, etc.

The structure of the embodiment for recording the original image data that was read out from the image reading unit is explained here. Needless to say however, the image data may also be data, for instance, image data from a digital camera, image data already recorded on a record medium or image data downloaded from the Internet or image data transferred over communication lines from other image processing devices, and when this image data is recorded onto a record medium, the image data can be read out from the record medium and the following processing can be performed.

Figure 9:
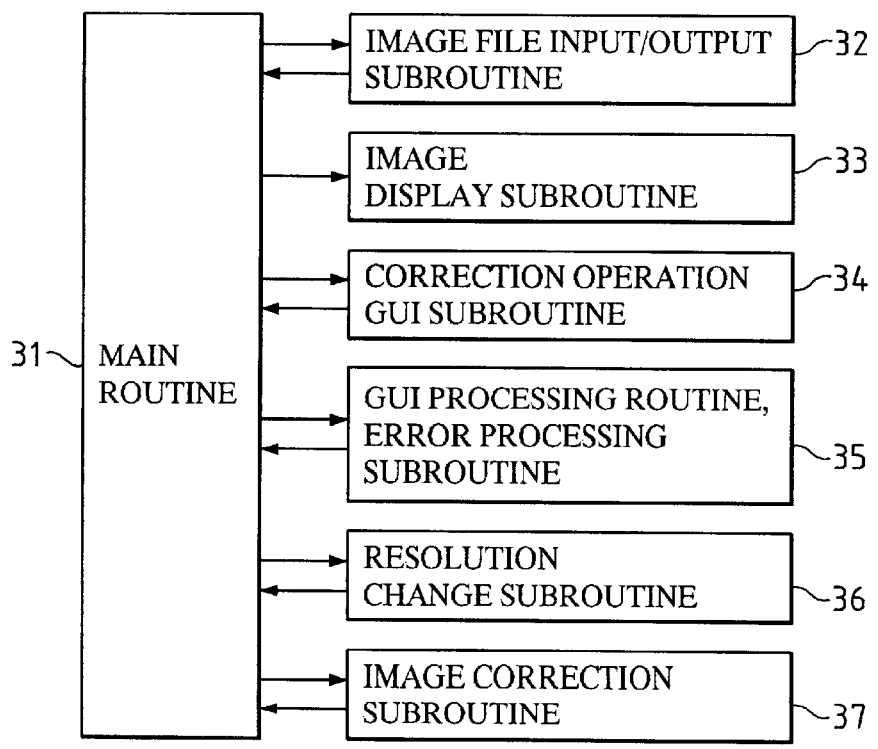
FIG. 9 is a block diagram showing an overall view of the structure of the image correction processing software.

FIG. 9 is a block diagram showing an overall view of the structure of the image correction processing software implemented on the CPU21. The image correction software is comprised of a main routine 31 for controlling the overall image processing and a subroutine coupled to the main routine. The subroutine contains an image file input/output routine 32 for driving the image reading unit 22 and the image recording unit 23 and performing input and output of image data, an image display routine 33 for displaying the image processing status, a correction operation GUI routine 34, a GUI process routine/error process routine 35, a resolving change routine 36, and an image correction routine 37.

The routines other than the image correction routine are publicly known in the conventional art so an explanation is omitted here. Hereafter, the features of the image correction routine of this invention will be described.

Figure 10:
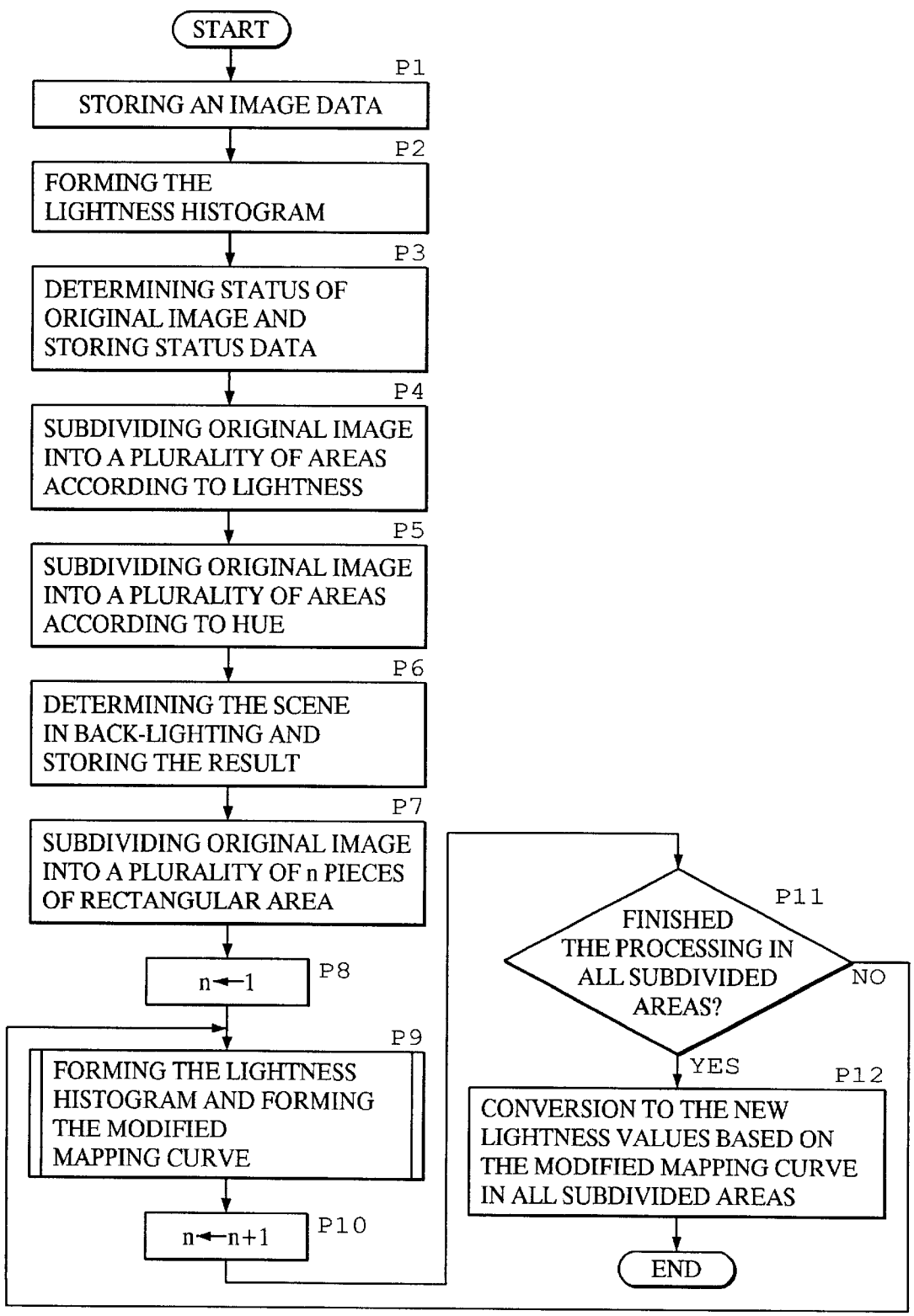
FIG. 10 is a flowchart illustrating the image correction routine for correcting the contrast and lightness of the original image.

FIG. 10 is a flowchart describing the image correction process of the image correction routine for correcting the contrast and lightness of the original image.

First of all, the image data obtained from reading the original image for processing with an image reading unit 22 or the image data recorded on the record media are stored in an image memory 24 (step P1). The image store in the image memory 24 is readout (or loaded) and a lightness histogram is formed (step P2) showing the frequency distribution of lightness for pixels constituting the image. The status of the original image in other words whether the image is a high contrast image or an image that is over-light or under-light in localized spots is determined, and information showing this status of the original image is stored in a memory 25 (step P3). The lightness histogram made here is for determining the status of the overall image and so is a histogram for showing the lightness frequency distribution for pixels of the overall image area.

The original image is next subdivided into a plurality of areas grouped according to lightness (step P4). For instance, a particularly bright image area is set as a lightness area A, a medium lightness image area is set as a lightness area B and a dark image area is set as lightness area C, etc.

Further, the original image is next subdivided into a plurality of areas grouped according to hue (step P5). For instance, a mainly intense red image area is set as a hue area R, a mainly intense yellow image area is set as a hue area Y, and a mainly intense green area is set as a hue area G.

Still further, the edge of a black-covered image area is found from the information on areas subdivided by hue and information on areas subdivided by lightness, and the image then determined to be a scene in back lighting based on the surrounding images and on the difference in edge lightness. When determined to be a back lighting scene, information indicating a back lighting scene is stored in memory 25 (step P6).

The original image is next subdivided into a plurality of n pieces of rectangular areas of a fixed size (step P7), a count value 1 is set in the counter (step P8), and a lightness histogram is formed showing the lightness frequency distribution of the pixels in the n-th (initially n=1) area, and a modified mapping curve constituted of accumulation values (sum of values per pixel lightness) of the lightness histogram is formed (step P9). A detailed description will be given next.

Incrementing the contents of the counter (step P10) and a check is made as to whether or not the making of the modified mapping curve for all the n pieces of rectangular areas is finished (step P11). If making of the modified mapping curves is not finished then the process returns to step P9 and the previous processing is completed. When determined in step P11 that the modified mapping curves have been obtained for all the subdivided rectangular areas, then a conversion to the new lightness values (step P12) is made based on the modified mapping curve for the pixel lightness of all areas, and the processing is complete.

In portions adjoining the subdivided rectangular areas, processes such linear interpolation may be performed based on the modified mapping curve of adjoining rectangular regions so that the pixel lightness in adjoining portions of the rectangular area will consecutively change. Further, for subdivided areas having image edges, when the size of the rectangular area for the edge is smaller than for the other rectangular areas, then linear interpolation may be performed so that the pixel lightness values of the edges are consecutive.

Next, details of the processing of the modified mapping curve previously described for step P9 in the flowchart of FIG. 10 will now be explained while referring to the flowchart of FIG.

The lightness histogram, average lightness, dispersion and most frequent hue value are provided in each of the subdivided rectangular areas (step P21). In order to suppress the effect of lightness changes from extremely small areas, an average lightness value is determined as an average value of the lightness group values of each subdivided area contained in the rectangular areas. However, when the lightness group contains extremely large areas or the lightness group contains extremely small areas, then the lightness group value of that area is employed as an average lightness value in order to prevent failure to correct the lightness of the area for correction.

The dispersion value is obtained by statistically analyzing the lightness histogram. The most frequent hue value is the hue value contained to the largest extent in a particular area. More specifically, the hue is separated into groups in specific individual widths, a determination made of what group each pixel hue belongs to and a count of numbers of pixels is made for each group. This count value of the largest group is determined as the most frequent hue value.

Next, correction of the clipping level (step P22) is executed based on the clipping level correction table shown in FIG. 1, as previously explained from the image scene (background), average lightness value, dispersion and most frequent hue value. In other words, the clipping level is corrected in response to a scene that is "normal", "backlighting or high contrast", "over-light in localized spots" or "under-light in localized spots". In correction by means of the clipping level correction table shown in FIG. 1, the calculated clipping level correction is not performed; in cases where the clipping level is set to zero (0) and not corrected, and in cases with conditions other than listed in the clipping level table shown in FIG. 1.

Clipping at the correction clipping level of the previously made lightness histogram is performed and pixels exceeding this clipping level are assigned equally to the overall lightness value (step P23). Here, the processing for equally assigning pixels exceeding this clipping level to the overall lightness value is performed just the same as the conventional process explained in FIG. 15.

The clipping level is determined to be zero (0) or not (step P24) and when the clipping level is in fact zero (0), the subsequent processing is not performed and the process returns to the main routine. Also, when the clipping level is not zero (0), the lightness level transfer amount is found from the image scene and the average lightness (step P25).

Further, the lightness level of the lightness histogram previously made is converted by the lightness level shown in FIG. 2 to a lightness histogram with a new lightness level (step P26). This conversion is explained later in detail. An accumulation curve of the lightness histogram is made, a modified mapping curve obtained (step P27) and the process then returns to the main routine.

Figure 12:
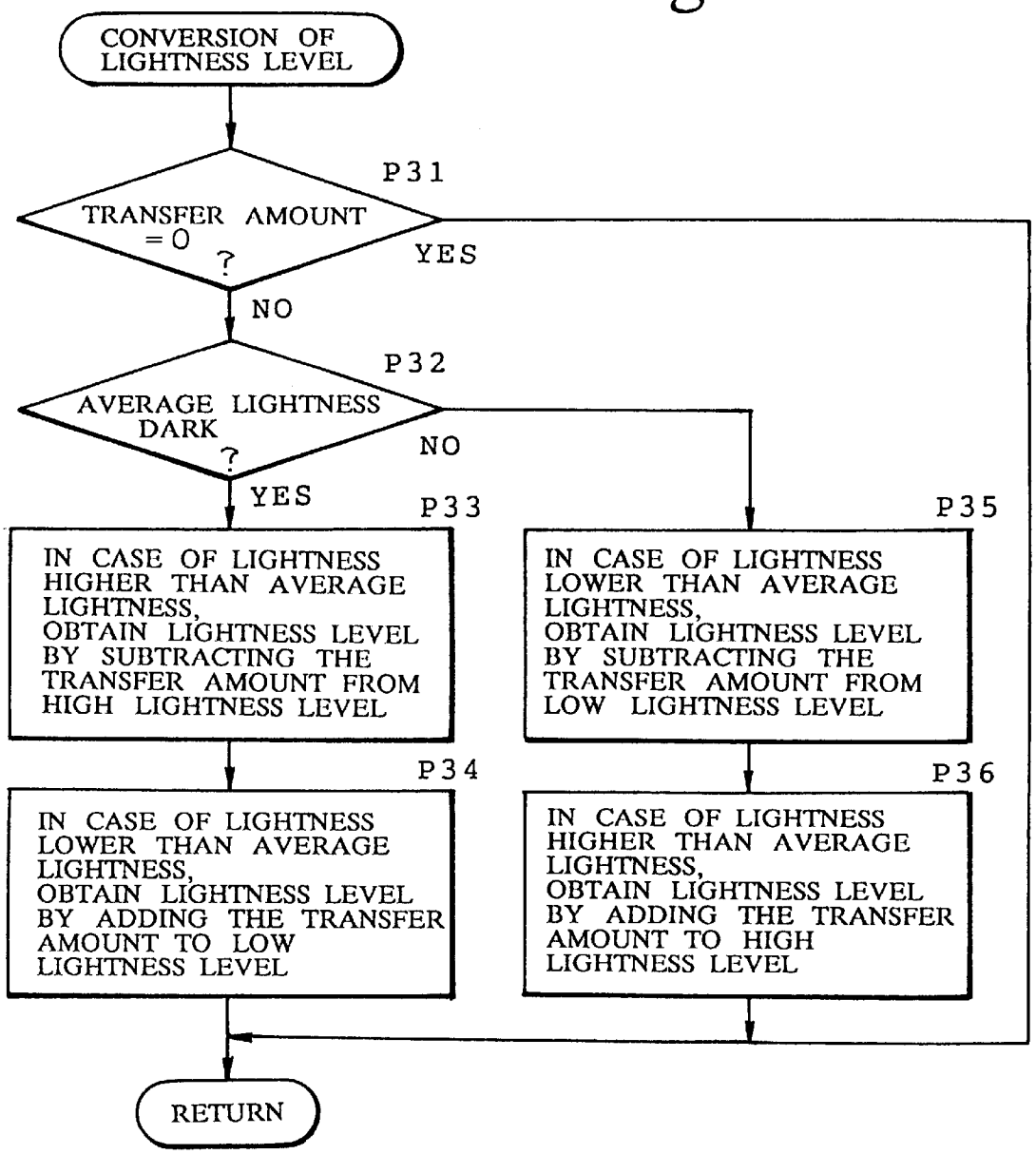
FIG. 12 is a flowchart illustrating in detail the process for transferring the lightness level.

Next, details of the conversion process of the lightness level of the lightness histogram explained at step P26 of the flowchart of FIG. 11 are explained while referring to the flowchart of FIG. 12.

First of all, whether or not the transfer amount of the lightness level is a zero (0) or not is determined (step P31), when the transfer amount is zero (0), transfer of the lightness level is not performed and the process returns to the main routine.

When the lightness level of the transfer amount is not zero (0), a determination is made as to whether the average lightness is dark or not (step P32).

When determined in step P32 that the average lightness is dark, in case of the lightness higher than the average lightness, the lightness level is obtained by subtracting the transfer amount from the high lightness value (step P33). Further, in case of the lightness lower than the average lightness, the lightness level is obtained by adding the transfer amount to the low lightness level (step P34).

When determined in step P32 that the average lightness is bright, in case of the lightness lower than the average lightness, the lightness level is obtained by subtracting the transfer amount from the low lightness value (step P35). Further, in case of the lightness higher than the average lightness, the lightness level is obtained by adding the transfer amount to the high lightness level (step P36).

The above described image processing device may also be comprised by a separate computer. Further, copy machines such as using electro-photographic system and printers may also be incorporated. Further, the software for performing image correction of the image may be incorporated beforehand in the copy machines and printers, or may be recorded on a machine readable recording medium and if needed may also be loaded into the desired image processing computer.

In the above described embodiment, the original image is subdivided into a plurality of rectangular areas and a modified mapping curve made for each of these areas. Alternatively however, the original image may be subdivided into areas with approximately the same lightness and the modified mapping curve made by the same method as described above. In such a case, the lightness group value of each area is utilized as the average lightness. Since contrast correction is performed on areas having approximately the same lightness, the average lightness matches the peak position of the histogram and accuracy of the correction can therefore be increased.

Also, the peak position and the average lightness will not match when the peak of the histogram is 2 or greater so the size of the subdivided rectangular area can be changed in order to make the peak position match the average lightness. The accuracy of the contrast correction can also be increased. Accordingly, a fixed size should not be set for the rectangular area and the size should be varied according to the circumstances.

In the image correction device and the image correction method of this invention as related above therefore, the original image for processing is subdivided into a plurality of rectangular areas, information is obtained relating to the average lightness and image scene information, and the pixel lightness corrected based on this information so that even when the image has areas that are extremely bright or areas that are extremely dark, a change to an image with an appropriate contrast and lightness can be made, enhanced contrast can be limited especially in cases with skin color areas such as in images of people, and the contrast and the lightness of the image can therefore be corrected.

What is claimed is:

1. An image correction device, comprising:
   a memory for storing image information of an original image;
   an image area dividing controller for subdividing the original image stored in the memory into a plurality of subdivided image areas;
   a histogram producing controller for creating a histogram showing frequency distribution of lightness for pixels contained in each of the subdivided image areas;
   a lightness calculation controller for calculating an average lightness of each of said subdivided image areas;
   a mapping curve generating controller for generating a mapping curve from said histogram based on information relating to the average lightness and on information relating to said original image stored in the memory; and
   a lightness conversion controller for correcting the lightness of the pixels constituting the original image stored in the memory based on said mapping curve.

2. An image correction device of claim 1, further comprising a most frequent hue calculation controller to calculate a most frequent hue value for each of said subdivided image areas, wherein said mapping curve generating controller also generates a mapping curve from said histogram based on said most frequent hue value.

3. An image correction device as claimed in claim 1, further comprising a dispersion calculation controller to calculate a dispersion value for each of said subdivided image areas, wherein said mapping curve generating controller also generates a mapping curve from said histogram based on said dispersion value.

4. An image correction device as claimed in claim 2, further comprising a dispersion calculation controller to calculate a dispersion value for each of said subdivided image areas, wherein said mapping curve generating controller also generates a mapping curve from said histogram based on said dispersion value.

5. An image correction device as claimed in claim 2, wherein said mapping curve generating controller performs clipping of said histogram by a clipping level established based on information relating to the original image, information relating to said average lightness and said most frequent hue value and generates a mapping curve.

6. An image correction device as claimed in claim 3, wherein said mapping curve generating controller performs clipping of said histogram by a clipping level established based on information relating to the original image, information relating to said average lightness and information relating to said dispersion value and generates a mapping curve.

7. An image correction device as claimed in claim 4, wherein said mapping curve generating controller performs clipping of said histogram by a clipping level established based on information relating to the original image, information relating to said average lightness, most frequent hue value and information relating to said dispersion value, and generates a mapping curve.

8. An image correction device as claimed in claim 1, wherein said lightness conversion controller adjusts a transfer amount for correcting the lightness of the pixels constituting the original image based on information relating to said average lightness and information relating to said original image.

9. An image correction device as claimed in claim 2, wherein said lightness conversion controller adjusts a transfer amount for correcting the lightness of the pixels constituting the original image stored in memory based on information relating to said average lightness and information relating to said image scene.

10. An image correction device as claimed in claim 4, wherein said lightness conversion controller adjusts a transfer amount for correcting the lightness of the pixels constituting the original image stored in memory based on information relating to said average lightness and information relating to said original image.

11. An image correction device as claimed in claim 1, wherein information relating to said original image comprises information that the original image is a normal scene, a high-contrast scene, a back-lighting scene, a localized over-light scene with a portion of the image lightness being brighter than a reference lightness or a localized under-light scene with a portion of the image lightness being darker than the reference lightness.

12. An image correction device as claimed in claim 11, wherein information relating to said original image is determined from information showing the shape of the histogram.

13. An image correction method, comprising:
a step to store image information in an image memory;
a step to subdivide an original image stored in the image memory into a plurality of subdivided image areas;
a step to make a histogram showing frequency distribution of lightness of pixels contained in each of the subdivided image areas;
a step to calculate an average lightness of the subdivided image areas;
a step to make a mapping curve from said histogram based on information relating to said average lightness and on information relating to the original image recorded in said image memory; and
a lightness conversion step to correct the lightness of the pixels constituting the original image based on said mapping curve.

14. An image correction method as claimed in claim 13, further comprising:
a step to calculate a most frequent hue value in each of the subdivided image areas; and
a step to make said mapping curve from said histogram based on information relating to the original image recorded in the image memory and information relating to said average lightness and said most frequent hue value.

15. An image correction method as claimed in claim 13, further comprising:
a step to calculate a dispersion value in each of the subdivided image areas; and
a step to make said mapping curve from said histogram based on information relating to the original image recorded in the image memory and information relating to said average lightness and said dispersion value.

16. An image correction method as claimed in claim 14, further comprising:
a step to calculate a dispersion value in each of the subdivided image areas; and
a step to make said mapping curve from said histogram based on information relating to the original image recorded in the image memory and information relating to said average lightness, said most frequent hue value, and said dispersion value.

17. A computer program product in memory for executing the image correction method as claimed in claim 13.

18. A computer program product in memory for executing the image correction method as claimed in claim 14.

19. A computer program product in memory for executing the image correction method as claimed in claim 15.

20. A computer program product in memory for executing the image correction method as claimed in claim 16.

21. An image correction device, comprising:
a memory for storing image information of an original image;
an image area dividing controller for subdividing the original image stored in the memory into a plurality of subdivided image areas;
a histogram producing controller for creating a histogram showing frequency distribution of lightness for pixels contained in each of the subdivided image areas;
a most frequent hue calculation controller for calculating a most frequent hue value for each of said subdivided areas;
a mapping curve generating controller for generating a mapping curve from said histogram based on information relating to the most frequent hue value and on information relating to said original image stored in the memory; and
a lightness conversion controller for correcting the lightness of the pixels constituting the original image stored in the memory based on said mapping curve.

22. An image correction device, comprising:
a memory which stores image data;
a first controller which creates a histogram showing frequency distribution of lightness for pixels contained in the image data stored in the memory;
a second controller which creates a mapping curve from said histogram based on at least one of a kind of lighting condition, an average lightness, a most frequent hue, and a dispersion value; and
a third controller which converts the lightness of the pixels constituting the image data stored in the memory based on the mapping curve.

23. An image correction method, comprising:
a step to store image information in an image memory;
a step to subdivide an original image stored in the image memory into a plurality of subdivided areas;
a step to make a histogram showing frequency distribution of lightness for pixels contained in each of the subdivided image areas;
a step to calculate a most frequent hue value for each of said subdivided areas;
a step to make a mapping curve from said histogram based on information relating to the most frequent hue value and on information relating to said original image stored in the memory; and
a lightness conversion step to correct the lightness of the pixels constituting the original image based on said mapping curve.

24. An image correction method, comprising:
a step to store image data in a memory;
a step to make histogram showing frequency distribution of lightness for pixels contained in the image data stored in the memory;
a step to make a mapping curve from said histogram based on at least one of a kind of lighting condition, an average lightness, a most frequent hue, and a dispersion value; and
a lightness conversion step to correct the lightness of the pixels constituting the original image data stored in the memory based on the mapping curve.

25. A computer program product for providing an image correction, the computer program product having a medium with a computer program embodied thereon, the computer program comprising:
computer program code for storing image information in an image memory;
computer program code for subdividing an original image stored in the image memory into a plurality of subdivided areas;
computer program code for making a histogram showing frequency distribution of lightness for pixels contained in each of the subdivided image areas;
computer program code for calculating a most frequent hue value for each of said subdivided areas;

computer program code for making a mapping curve from said histogram based on information relating to the most frequent hue value and on information relating to said original image stored in the memory; and computer program code for correcting the lightness of the pixels constituting the original image based on said mapping curve.

26. A computer program product for providing an image correction, the computer program product having a medium with a computer program embodied thereon, the computer program comprising:

computer program code for storing image data in a memory;

computer program code for making histogram showing frequency distribution of lightness for pixels contained in the image data stored in the memory;

computer program code for making a mapping curve from said histogram based on at least one of a kind of lighting condition, an average lightness, a most frequent hue, and a dispersion value; and computer program code for correcting the lightness of the pixels constituting the original image data stored in the memory based on the mapping curve.

* * * * *

UNITED STATES PATENT AND TRADEMARK OFFICE
CERTIFICATE OF CORRECTION

PATENT NO.    : 6,643,398 B2
DATED         : November 4, 2003
INVENTOR(S)   : Kagumi Moriwaki It is certified that error appears in the above-identified patent and that said Letters Patent is hereby corrected as shown below:

Column 1,
Line 21, after "image", insert -- , --.
Line 28, after "then", delete "an", and insert -- a --.
Lines 41 and 43, delete "then".
Line 55, delete "then", and insert -- are --.
Lines 62 and 63, delete "values, the", and insert -- values. The --.
Line 66, delete "values, image", and insert -- values. Image --.

Column 2,
Line 12, after "made", delete "the", and insert -- In the --.
Line 17, delete "CL1, the", and insert -- CL1. The --.
Line 22, after "level", delete ",".
Lines 40 and 41, delete "or in words" and insert -- or, in other words, --.
Line 42, delete "or in other words" and insert -- or, in other words, --.

Column 3,
Line 4, delete "area", and insert -- areas --.
Line 5, after "If" insert -- it is --.
Line 9, delete "done", and insert -- performed --.
Lines 12 and 16, delete "then".
Line 19, after "conversion", insert -- is --.
Line 25, delete "high contrast", and insert -- high-contrast --.
Line 25, delete "back light", and insert -- back-lighted --.
Line 29, after "bright", insert -- , --.
Lines 36 and 41, after "and", insert -- an --.
Line 51, delete "reference", and insert -- referenced --.
Line 54, after "provide", insert -- a --.

Column 4,
Line 64, after "enhancement", insert -- , --.

Column 5,
Lines 9 and 10, delete "or not".
Lines 10 and 11, delete "that is, an area having almost uniform lightness and low contrast,", and insert -- (an area having almost uniform lightness and low contrast) --.
Line 12, delete "the image scene is a normal scene", and insert -- a normal scene, a scene with --.
Lines 13 and 14, after "image", insert -- that is --.

UNITED STATES PATENT AND TRADEMARK OFFICE
CERTIFICATE OF CORRECTION

PATENT NO.      : 6,643,398 B2
DATED           : November 4, 2003
INVENTOR(S)     : Kagumi Moriwaki It is certified that error appears in the above-identified patent and that said Letters Patent is hereby corrected as shown below:

Column 5, (continuation),
Lines 17 through 19, delete "in back lighting or high contrast scene, when determined that the average brightness is excessively dark," "dark, "excessively bright", or "bright", and insert -- in a back-lighted or high-contrast scene, when it is determined that the average brightness is "excessively dark, "dark", "excessively bright" or "bright." --.
Line 22, after "excessively dark", insert -- , --.
Line 22, after "dark", insert -- , --.
Line 49, after "portion", insert -- , --.
Line 50, after "color" , insert -- , --.
Line 59, after "attach" , delete "to", and insert -- too -- .

Column 6,
Line 2, after "small", insert -- , --.
Line 2, delete "set" , and insert -- and --.
Line 3, after "(0),", delete "," and insert -- i.e., --.
Lines 4 and 5, delete "in cases where", and insert -- and --.
Line 10, delete "and set", and insert -- wherein --.
Line 10, delete "as", and insert -- is set zero (0); and --.
Lines 12 through 15, after "and", insert -- the most frequent hue value is a red-to-yellow, --.
Lines 19 and 20, delete "bright, and further the dispersion is 'small', and set the clipping level as "zero (0)", and insert -- bright, and the depression is 'small' , wherein the clipping level is set to zero (0), and --.
Line 29, after "and", delete "further".
Line 30, delete "and set the", and insert -- wherein the --.
Line 30, delete "as zero (0)", and insert -- is set to zero (0), and --.
Line 34, after "determined", insert -- , --.
Line 67, after "bright," , delete "then".

Column 7,
Line 2, delete "then".
Line 14, delete "large", and insert -- large. The --.
Line 26, delete "large", and insert -- larger --.
Line 26, after "when", insert -- it is --.
Line 29, delete "large", and insert -- larger --.
Line 32, after "or", insert -- , --.

UNITED STATES PATENT AND TRADEMARK OFFICE
CERTIFICATE OF CORRECTION

PATENT NO.    : 6,643,398 B2
DATED         : November 4, 2003
INVENTOR(S)   : Kagumi Moriwaki It is certified that error appears in the above-identified patent and that said Letters Patent is hereby corrected as shown below:

Column 8,
Line 8, after "however", insert -- , --.
Line 9, after "pixels", delete "in other words", and insert -- ,i.e., --.
Line 9, after "brightness", insert -- , --.
Line 21, after "22", insert -- , --.
Line 21, after "reader", insert -- , --.
Line 32, delete "and further containing".
Line 36, after "say", insert -- , --.
Lines 36 through 38, delete "the image data may also be data, for instance, image data from a digital camera,", and insert -- the image data for example, may also be image data from a digital camera, --.
Line 38, after "medium", insert -- , --.
Line 39, after "Internet", insert -- , --.
Line 41, delete "and" and insert -- or, --.
Lines 41 and 44, delete "when this image data is recorded onto a record medium, the image data can be read out from the record medium and the following can be performed", and insert -- when this image data is recorded onto a record medium, the image data can be read from the recording medium --.
Line 49, delete " a subroutine", and insert -- subroutines --.
Line 49, delete routine." and insert -- subroutine 31. --.
Lines 49 and 50, delete "The subroutine contains.", and insert -- The subroutines include --.
Line 50, delete "routine", and insert -- subroutine --.
Line 52, after "data" delete ",", and insert -- ; --.
Line 53, delete "routine", and insert -- subroutine --.
Line 54, after "status", delete ",", and insert -- ; --.
Lines 54 and 55, delete "routine 34,", and insert -- subroutine 34; --.
Lines 55 through 57, delete "routine/error process routine 35, a resolving change routine 36, and an image correction routine 37." and insert -- subroutine/error process, subroutine 35; a resolution change subroutine 36; and an image correction subroutine 37 --.
Line 58, "routines 36," and insert -- subroutines --.
Line 58, "routine 37", and insert -- subroutine 37 --.
Lines 59 and 62, delete "routine", and insert -- subroutine 37 --.

UNITED STATES PATENT AND TRADEMARK OFFICE
CERTIFICATE OF CORRECTION

PATENT NO. : 6,643,398 B2
DATED : November 4, 2003
INVENTOR(S) : Kagumi Moriwaki It is certified that error appears in the above-identified patent and that said Letters Patent is hereby corrected as shown below:

Column 9,
Line 2, delete "read", and insert -- readout --.
Line 5, delete "image in other words", and insert -- image, in other words, --.
Line 7, after "spots", insert -- , --.
Lines 27 and 28, delete "image then determined to be a scene in back lighting", and insert -- image is determined to be a scene in back-lighting --.
Line 29, delete "back-lighting", and insert -- back-lighted --.
Line 44, after "finished", insert -- , --.
Lines 45 and 46, delete "When determined", and insert -- When it is determined --.
Line 49, delete "then a conversion", and insert -- a conversion --.
Line 59, delete "then linear", and insert -- the linear --.

Column 10,
Line 7, delete "then the lightness", and insert -- the lightness --.
Line 15, after "determination", insert -- is --.
Line 16, after "to", insert -- , --.
Line 22, after "value,", insert -- and --.
Line 28, after "performed", delete ";".
Line 35, delete "Here, the", and insert -- The --.
Line 40, delete "zero (0), the", and insert -- zero (0). If the clipping level is determined to be zero (0), then --.
Line 57 and 58, delete "zero (0) or not is determined (step P31), when", and insert -- zero (0) is determined (step P31). When --.
Lines 63 and 64, delete "determination is made as to whether the average lightness is dark or not (step P32)." and insert -- determination is made as to whether or not the average lightness is dark (step P32) --.
Lines 65 and 66, delete "average lightness is dark, in case of the lightness higher", and insert -- average lightness is dark and the lightness is higher --.

Column 11,
Lines 2 and 3, delete "Further, in case of the lightness lower", and insert -- Further, when the average lightness is dark and the lightness is lower -- .
Lines 5 and 6, delete "bright, in case of the lightness lower", and insert -- bright, and the lightness is lower --.
Line 9, delete "Further, in case of the lightness is higher", and insert -- Further, when the average lightness is bright and the lightness is higher --.
Line 13, after "comprised", delete "by", and insert -- of --.

UNITED STATES PATENT AND TRADEMARK OFFICE
CERTIFICATE OF CORRECTION

PATENT NO. : 6,643,398 B2
DATED : November 4, 2003
INVENTOR(S) : Kagumi Moriwaki It is certified that error appears in the above-identified patent and that said Letters Patent is hereby corrected as shown below:

Column 11, (continuation),
Lines 23 and 24, after "Alternatively", insert -- , --.

Signed and Sealed this

Tenth Day of August, 2004

JON W. DUDAS
*Acting Director of the United States Patent and Trademark Office*